United States Patent [19]

Anderson

[11] Patent Number: 5,783,223
[45] Date of Patent: Jul. 21, 1998

[54] PLASTIC INJECTION MOLDING MACHINE WITH CONTINUOUS REMOVAL OF PARTICULATE CONTAMINANTS

[75] Inventor: Dennis C. Anderson, Northfield, Minn.

[73] Assignee: National Polymers Inc.

[21] Appl. No.: 704,386

[22] Filed: Aug. 27, 1996

[51] Int. Cl.$^6$ ................................................ B29C 45/58
[52] U.S. Cl. ........................ 425/185; 210/447; 425/190; 425/199
[58] Field of Search ........................ 425/185, 190, 425/197, 198, 199, 382 R, 149, 154; 269/169; 210/236, 447

[56] References Cited

U.S. PATENT DOCUMENTS

| | | | |
|---|---|---|---|
| 3,007,199 | 11/1961 | Curtis | 425/197 |
| 3,804,758 | 4/1974 | Cooper et al. | 425/190 |
| 3,817,377 | 6/1974 | Piggott | 425/199 |
| 3,962,092 | 6/1976 | Newman, Jr. | 210/236 |
| 4,174,198 | 11/1979 | Kinoshita | 425/135 |
| 4,416,605 | 11/1983 | Konno et al. | 425/185 |
| 4,434,053 | 2/1984 | Osuna-Diaz | 425/199 |
| 4,507,072 | 3/1985 | Gaul, Jr. | 425/185 |
| 4,701,118 | 10/1987 | Köching et al. | 425/185 |
| 4,781,563 | 11/1988 | Capelle | 210/447 |
| 4,880,374 | 11/1989 | Hamamura et al. | 425/185 |
| 5,507,498 | 4/1996 | Trott | 210/352 |
| 5,578,206 | 11/1996 | Ogoshi et al. | 210/236 |
| 5,607,583 | 3/1997 | Kreyenborg | 210/236 |

*Primary Examiner*—Jay H. Woo
*Assistant Examiner*—Iurie Schwartz
*Attorney, Agent, or Firm*—James V. Harmon

[57] ABSTRACT

A plastic injection molding machine is provided which includes a filter for the continuous removal of foreign particulate contaminants from molten resin. The molding machine has a filter assembly with a passage for molten plastic resin and also includes a movable filter body containing a plurality, e.g. two, removable filters movably supported within the filter assembly for transporting the filter element between at least a pair of alternate positions, including an operative position within the passage containing the molten plastic resin and a non-aligned inoperative position. The filter body has a bored opening containing the filter and an accumulation chamber for storing the foreign material upstream of the filter. During operation, the foreign material becomes lodged in the accumulation chamber within the filter body and remains stored within the filter body so that it can be removed each time the filter body is shifted to move one of the filters from an operative position to a non-aligned inoperative position. The foreign material collected and stored in the accumulation chamber is carried with the filter body when the filter body is shifted to an inoperative position where the foreign material can be removed from the filter assembly.

9 Claims, 3 Drawing Sheets

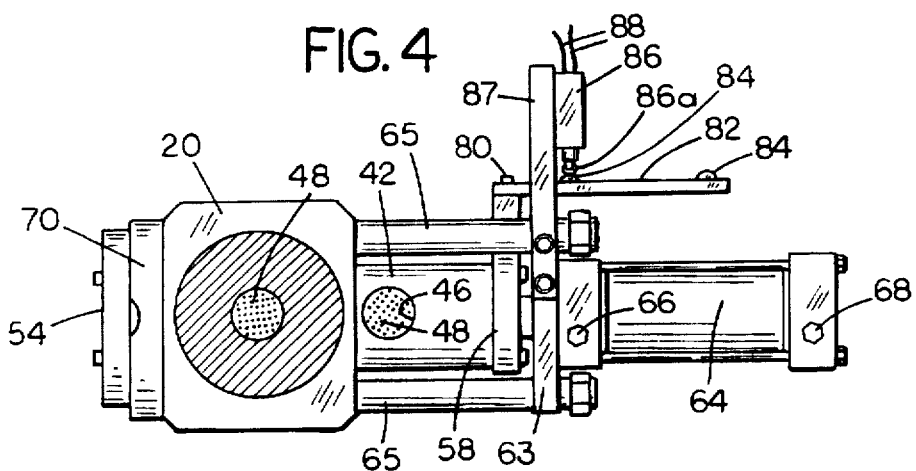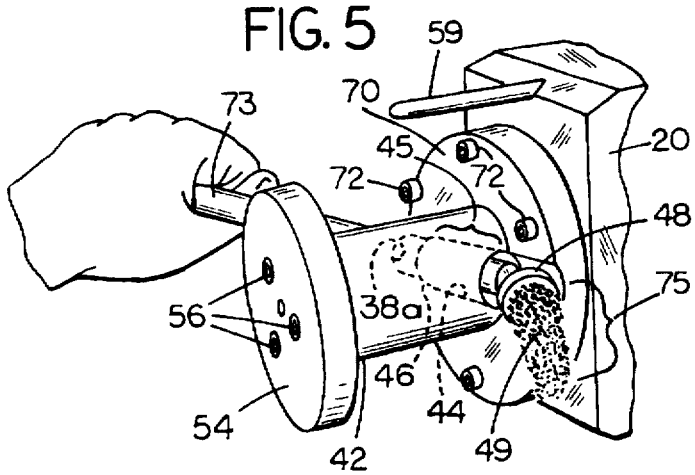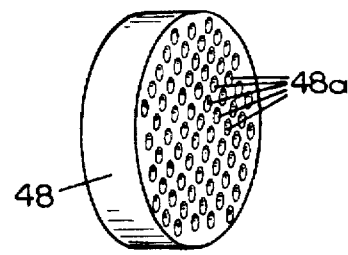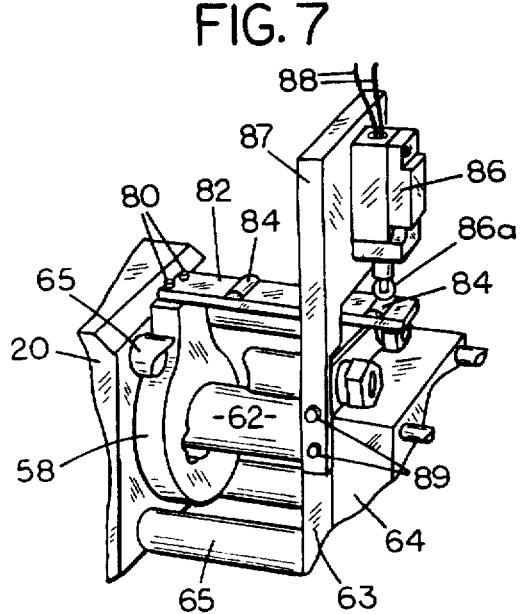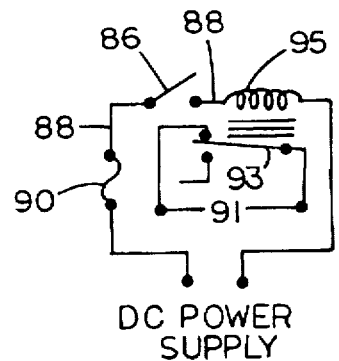

PLASTIC INJECTION MOLDING MACHINE WITH CONTINUOUS REMOVAL OF PARTICULATE CONTAMINANTS

FIELD OF THE INVENTION

This invention relates to plastic injection molding and more particularly to a molding machine that is capable of continuously removing particulate impurities from recycled scrap plastic.

BACKGROUND OF THE INVENTION

It has been previously proposed to remove foreign material from molten plastic in preparing resin particles, for example in a pelletizer used for producing resin particles or pellets which can be shipped to a manufacturer for producing plastic articles. These pelletizers, however, do not have to operate at the high pressure of an injection molding machine or throughout continuous production runs over extended periods of time with operating parameters which require rapid molding of precision parts with dimensions that must be accurately maintained. To be competitive, a molding operation must run continuously or almost continuously without breakdown, often for many hours. As a result, it has been the practice heretofore to remove contaminants from plastic in an operation that is separate from a production molding run, but this of course increases the cost of the scrap.

In view of these and other deficiencies of the prior art, it is a general objective of the present invention to provide continuous removal of particulate contaminants from recycled scrap plastic as the recycled scrap is introduced into an injection molding machine for molding plastic articles during the commercial production of the molded articles.

Another object is to find a way of removing the contaminants without interrupting the operation of the injection molding machine, i.e., to provide continuous operation.

Still another object is to mold precisely dimensioned plastic articles on a continuous basis using recycled plastic scrap, such as recycled beverage containers originally used for soda pop, milk, fruit juice or the like and contaminated with pieces of paper, metal and possibly other foreign material while conducting a commercial injection molding operation at substantially the same speed as with virgin plastic.

Yet another object is to provide a safety shutdown feature that will interrupt the operation of the molding machine if the flow of plastic to the molding machine is inadvertently cut off while foreign material is being removed.

These and other more detailed and specific objects of the present invention will be better understood by reference to the following figures and detailed description which illustrate by way of example but a few of the various forms of the invention within the scope of the appended claims.

SUMMARY OF THE INVENTION

A plastic injection molding machine is provided which includes a filter for the continuous removal of foreign particulate contaminants from molten resin. The molding machine has a filter assembly with a passage for molten plastic resin and also includes a movable filter body containing a plurality, e.g., two, removable filters movably supported within the filter assembly for transporting the filter element between at least a pair of alternate positions, including an operative position within the passage containing the molten plastic resin and a non-aligned inoperative position. The filter body has a bored opening containing the filter and an accumulation chamber for storing the foreign material upstream of the filter. During operation, the foreign material becomes lodged in the accumulation chamber within the filter body and remains stored within the filter body so that it can be removed each time the filter body is shifted to move one of the filters from an operative position to a non-aligned inoperative position. The foreign material collected and stored in the accumulation chamber is carried with the filter body when the filter body is shifted to an inoperative position where the foreign material can be removed from the filter assembly.

THE FIGURES

FIG. 4 is a view similar to FIG. 3 with the left filter in operation and the right filter exposed for removal;

FIG. 5 is a perspective view of the left end of the foreign material removal mechanism as a filter and accumulated contaminants are being removed;

FIG. 6 is a perspective view of one form of filter on an enlarged scale;

FIG. 7 is a perspective view of the right end of the foreign material removal mechanism to illustrate the operation of the safety control;

FIG. 8 is a circuit diagram of the safety control;

DETAILED DESCRIPTION OF THE INVENTION

Figure 1:
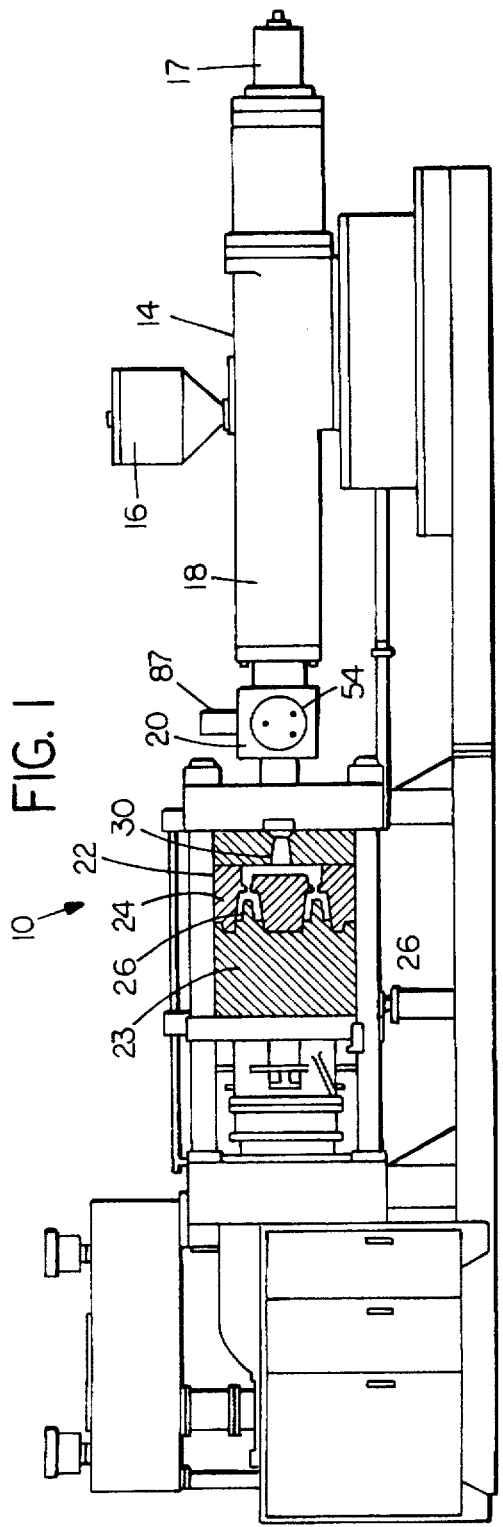
FIG. 1 is a side elevational view of a plastic injection molding machine in accordance with the invention.

A plastic injection molding machine indicated generally by the numeral 10 is shown in FIG. 1. The general layout of the molding machine 10 is similar to any of various commercially available machines and includes a molding assembly 22, a standard barrel-and-screw assembly or extruder 14 which is provided with heaters (not shown) of standard construction to heat the plastic resin as it is withdrawn from a hopper 16 and transferred under pressure (from right to left in the figure) through a barrel 18 containing a conventional screw auger 19 that is rotated during operation by means of a motor 17 to feed the hot molten plastic through the barrel 18 and past the end 15 of the auger 19 into an inlet passage 13 of a filter assembly 20 which has a metal housing that is suitably secured, e.g., by bolts 21 to the barrel 18 of the extruder 14. The resin can be scrap plastic that contains particulate contaminants, i.e., foreign material. During operation, foreign material is removed from the resin in the filter assembly 20 as will be described below. The resin passes from a filter assembly outlet duct 38 through a duct or sprue 30, thence into the molding assembly 22 containing one or mold cavities 26 located between a force half 23 and a negative half 24. During operation, the molding assembly 22 is opened and closed repeatedly as plastic parts are formed in the mold cavities 26. Typically, about 500 pounds of molded parts can be formed per hour. A typical production run may last several months or more. 24 hours/day, with resin supplied from the extruder 14 under a pressure of about 14,000 psi continuously passing through the filter assembly 20 into the injection molding assembly 22. Since the construction and operation of the injection molding apparatus 20 excluding the filter assembly 10 is well know to those skilled in the art, no further description is necessary.

Refer now to FIGS. 2–6. Within the filter assembly 20 is a transverse bore 40 in which is sidably mounted a cylindrical filter body 42 that is itself provided with a pair of laterally spaced apart parallel, generally cylindrical openings 44 and 46, each having a shoulder 47 (FIG. 2) at its downstream end for supporting a removable disc-shaped filter 48 provided with a multiplicity of bored passages 48a (FIG. 6) that allow the molten resin to pass but trap foreign material 49 within the bore 44 or 46, as the case may be. In a typical injection molding machine using a filter 48 that is about 1.25 inches in diameter, about 70 bored openings 48a can be used that are each 0.060 inch in diameter. An important feature of the invention is the provision of an accumulation chamber 45 within the filter body 42 upstream of the filter 48 which in a typical unit is from two to four inches deep in which foreign material 49 accumulates and is stored until it is removed as will be described below. The accumulation chamber 45 enables the molding operation to continue without interruption while foreign material piles up on the upstream side of the filter 48 and provides a reliable way of storing and removing all of the accumulated foreign material 49 so that little, if any, will be left in the filter assembly 20 after one of the filters 48 has been shifted from an operating mode to an inoperative position for replacement and/or cleaning.

The filter assembly 20 can be suitably heated with internal electrical heaters and/or band heaters, such as the band heaters 50, 52 (FIG. 2) to keep the plastic resin at the desired elevated temperature.

Figure 3:
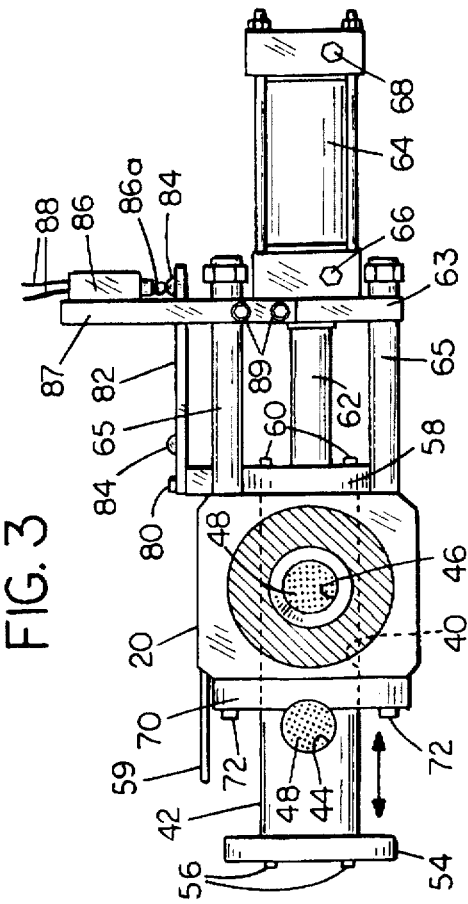
FIG. 3 is a transverse vertical sectional view taken on line 3—3 of FIG. 2 with the right filter in operation and the left filter exposed for removal or inspection.

As best shown in FIG. 3, the filter body 42 is provided with a pair of end plates or stops 54, 58 secured to the filter body 42 as by bolts 56, 60 which limit lateral movement of the filter body 42. Secured to the end plate 58, e.g., by welding or screw threads, is an actuator rod 62 of a linear actuator such as a hydraulic cylinder 64 to which hydraulic fluid is fed through lines 66, 68 for extending and retracting the actuator rod 62 so as to shift the filter body 42 back and forth from left to right whenever the accumulation chamber 45 that is then in operation becomes filled to capacity with foreign material 49. The filter body 42 is shifted back and forth between the two positions shown in FIGS. 3 and 4 so that the bores 44, 46 of the filter body are alternately aligned with the inlet passage 13. In a typical installation, good results are obtained when the shifting of the filter body 42 between the positions of FIGS. 3 and 4 is done in about one second. The left end of the filter assembly 20 is covered with an annular end plate 70 which is secured in place by means of bolts 72 for sealing the left end of the bored opening 40.

The actuator 64 is supported upon a vertical mounting plate 63 which is in turn connected to the filter assembly 20 by four parallel spacer rods 65, each secured at its left end, e.g., by means of screw threads to the filter assembly 20.

Fastened to the plate 63, e.g., by means of bolts 89, is a control switch support plate 87 having a normally closed control switch 86 mounted thereon which is wired by means of conductors 88 into a safety control circuit shown in FIG. 8. The switch 86 has an operating arm 86a that is actuated by one of two laterally spaced apart cams 84 fixed to a horizontal plate 82 which is itself secured, e.g., by bolts 80, to the end plate 58 of the filter body 42 so that when either of the cams 84 engages the operating arm 86a, the switch 86 is held closed, thereby enabling the extruder 14 and injection molding machine 10 to continue operation as will be described more fully below.

Figure 2:
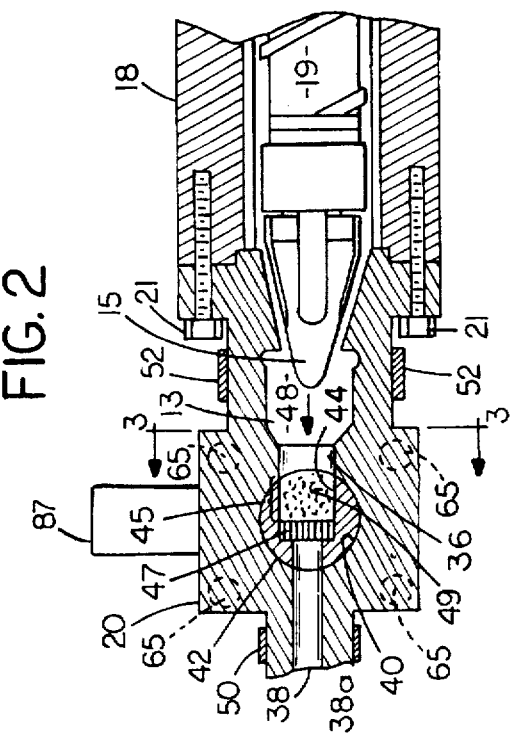
FIG. 2 is a central vertical sectional view of the foreign material accumulation and removal mechanism.

Secured to the top of the end plate 58 is a horizontally extending guide rod 59 (FIGS. 3 and 5) which is slidably mounted within a bored opening in the top of the filter assembly 20 to serve as a guide for keeping the sliding filter body 42 positioned so that the bored openings 44, 46 are aligned horizontally the same as the inlet passages 13 and 36 (FIG. 2).

The removal of foreign material 49 which is stored in the accumulation chamber 45 is shown in FIG. 5. FIG. 5 illustrates the filter 48 being removed manually with a tool such as a metal rod 73 inserted into the bored opening 38a of the filter body 42 to force the filter 48 and the foreign material 49 that is stored in the accumulation chamber 45 out through the mouth, i.e., the right end of the accumulation chamber 45, where it can be collected and disposed of. The filter 48 can then be cleaned and reinserted against the shoulder 47 at the left end of the accumulation chamber as shown in FIG. 2. It will be noticed that as the tool 73 presses the filter 48 out, the filter 48 acts as a plunger or piston to scrape the walls so as to expel all of the foreign material 49 from the accumulation chamber 45. The filter assembly 20 is allowed to continue to operate with the right filter (FIG. 3) in the operative mode until cleaning is required, at which time the actuator 64 is operated by the operator of the molding machine so as to retract the actuator rod 62 and filter body 42 to the position of FIG. 4. The right filter 48 can then be removed in the same manner for dislodging foreign material 49 stored in the accumulation chamber 45 in the bored opening 46. It is important to note that when the actuator 64 operates, foreign material 49 which is stored in accumulation chamber 45 is reliably held in the filter body 42 so that it will be transferred outside the housing of the filter assembly 20 when the filter body 42 moves to its new position where it can be easily removed.

Refer now to FIG. 8 which illustrates a safety shutdown control circuit of the present invention. As shown in the figure, DC power is supplied to the safety switch 86 through conductors 88 via relay 95 and fuse 90. When current is supplied to the relay 95 from the DC power supply through the switch 86, the relay 95 will hold a relay contact 93 in a closed or "on" position so that current can be carried between the terminals 91 that connect to the power supply for the injection molding machine 10, namely, the molding machine assembly 12 and the extruder 14. If the current through the switch 86 is interrupted only momentarily, the molding machine will continue to operate, but if the filter body 42 has become stuck in the wrong position so that neither of the bores 44 or 46 is aligned with the inlet duct 36, the molding machine 10 will be automatically shut down, thereby assuring safe operation and preventing damage to the machine which might otherwise occur, primarily due to the high internal pressure of the molten plastic. Thus, the safety shutdown control prevents the operating sequence from continuing if one of the bores 44, 46 is not aligned with inlet 13. During the brief time the filter body 42 is being moved by actuator 64, the current to motor 17 will be interrupted momentarily without producing any adverse effects.

Figure 9:
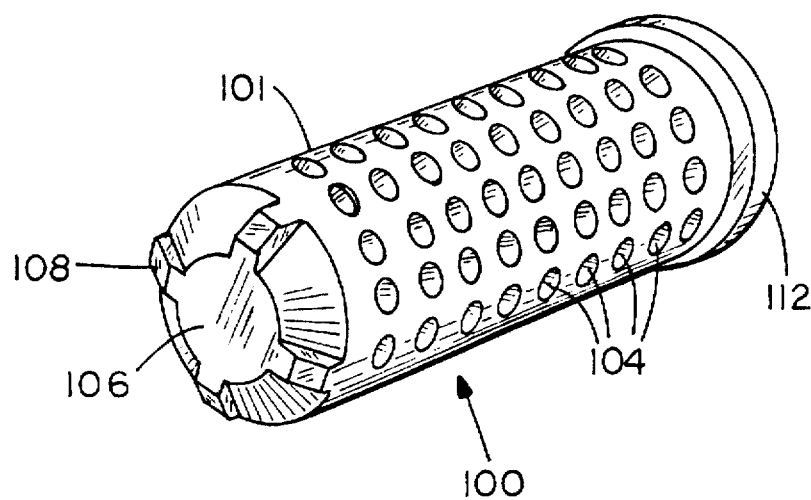
FIG. 9 is a perspective view of another form of filter.
Figure 10:
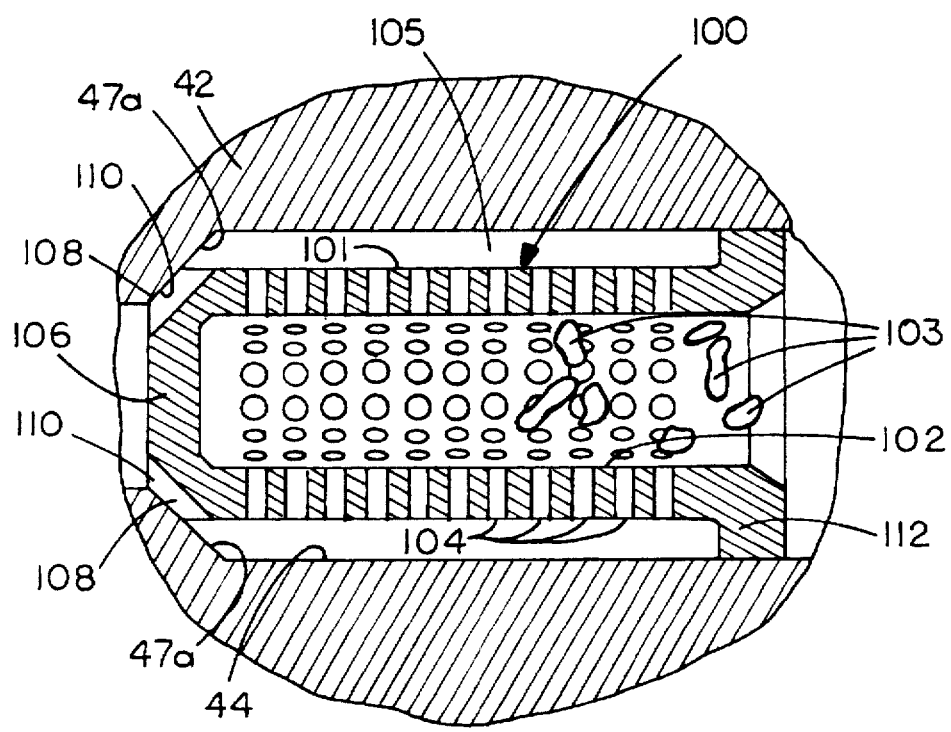
FIG. 10 is a view similar to FIG. 2 showing the filter of FIG. 9 installed.

Refer now to FIGS. 9 and 10 which illustrate another form of filter in accordance with the invention.

Shown in the figures is a filter 100 having a cylindrical barrel 101 and an internal central cavity 102 which communicates through a multiplicity of bored filter openings 104

(typically about 0.060 inch in diameter) in the barrel 101 with an annular space 105 surrounding the barrel of the filter 100. During operation, the molten plastic resin is able to flow from right to left in the figure through cavity 102, openings 104, annular space 105 and through an end passage 110, thence into the molding assembly 22 of the injection molding machine 10. The central cavity 102 serves as an accumulation chamber for foreign material 103, e.g., paper or metal, which becomes stored within the accumulation chamber 102. The filter 100 is supported in the bore 44 by means of a radially extending flange 112 at its right end and by means of spacer lugs 108 on the left end wall 106. The lugs 108 serve as stand-offs for providing the end passage 110 between the left end wall of the filter 100 and a shoulder 47a at the left end of the bore 44. The filter 100 is removed manually in the same manner already described in connection with the filter 48. The filter 100 is superior to filter 48, primarily because more filter openings are provided and, accordingly, it is less subject to becoming plugged. When the actuator 64 is operated, foreign material 103 in the accumulation chamber 102 is reliably shifted to the outside of the filter assembly 20 where it can be safely ejected with a tool, e.g., rod 73 as in FIG. 5.

Many variations of the present invention within the scope of the appended claims will be apparent to those skilled in the art once the principles described herein are understood.

What is claimed is:

1. A plastic injection molding apparatus having a provision for continuous removal of foreign particulate contaminants from molten plastic resin, said apparatus comprising, a molding assembly, a filter assembly connected to the molding assembly for receiving molten plastic that is fed into the molding assembly, said filter assembly having a housing with an inlet passage for molten plastic resin extending therethrough a movable filter body containing a plurality of removable filters, said filter body being movably supported within the filter assembly for shifting between at least two alternate positions, one of which communicates with the passage, whereby each of the filters is moved between an operative position communicating with the passage containing the molten plastic resin and a non-aligned inoperative position, the filter body has a plurality of openings,
 a) each containing one of the removable filters, and
 b) each opening includes an accumulation chamber located between a mouth at one end of the opening and the filter for the storage of foreign material that becomes lodged upstream of the filter, whereby foreign material collected in the accumulation chamber within the movable filter body remains within the filter body for removal and is carried with the filter body when the filter body is shifted from the operative position to the non-aligned inoperative position where the foreign material is removed from the filter assembly.

2. The apparatus of claim 1 wherein a safety shutdown control is operatively connected to the movable filter body to maintain the injection molding apparatus in operation only when one of the openings is aligned with the inlet passage for the molten plastic resin and to shut down the molding apparatus when neither of the openings is aligned with the inlet passage.

3. The injection molding apparatus of claim 1 wherein the filter assembly includes a pair of said filters and the filters are alternately moved to a position outside of the filter assembly so as to be exposed for examination and replacement by forcing the filter out of the movable filter body through the accumulation chamber in a direction proceeding toward an inlet end of the accumulation chamber to thereby simultaneously expel particulate contaminants that have become lodged in the accumulation chamber upstream of the filter.

4. The injection molding apparatus of claim 1 wherein the filter body is an elongated member having a pair of laterally spaced apart transverse openings intermediate the ends thereof, each opening includes a means for retaining one of said filters within the opening during operation and each opening defines an accumulation chamber upstream of the removable filter for storing accumulated particulate material that has become lodged within the filter body adjacent thereto to assure removal of the particulate contaminants in the accumulation chamber when the filter body is shifted so as to move one of the filters that is in an operating position to an inoperative position.

5. A plastic injection molding apparatus having a provision for continuous removal of foreign particulate contaminants from molten plastic resin, said apparatus comprising, a molding assembly, a filter assembly connected to the molding assembly for receiving molten plastic that is fed into the molding assembly, said filter assembly having a housing with an inlet passage for molten plastic resin extending therethrough a movable filter body containing a plurality of removable filters, said filter body being movably supported within the filter assembly for shifting between at least two alternate positions, one of which communicates with the passage, whereby each of the filters is moved between an operative position communicating with the passage containing the molten plastic resin and a non-aligned inoperative position, the filter body has a plurality of openings, each containing one of the removable filters, and each opening includes an accumulation chamber located between a mouth at one end of the opening and the filter for the storage of foreign material that becomes lodged upstream of the filter, the filter assembly includes a pair of said filters and the filters are alternately moved to a position outside of the filter assembly so as to be exposed for examination and replacement by forcing the filter out of the movable filter body through the accumulation chamber in a direction proceeding toward an inlet end of the accumulation chamber to thereby simultaneously expel particulate contaminants that have become lodged in the accumulation chamber upstream of the filter, whereby foreign material collected in the accumulation chamber within the movable filter body remains within the filter body for removal and is carried with the filter body when the filter body is shifted from the operative position to the non-aligned inoperative position outside of the injection molding apparatus where the foreign material is removed from the filter assembly.

6. The injection molding apparatus of claim 5 wherein a safety shutdown switch means is operatively connected to the movable filter body to maintain the injection molding apparatus in operation only when one of the openings in the filter body is aligned with the inlet passage for the molten plastic resin.

7. The injection molding apparatus of claim 1 wherein the filter comprises a filter body having a multiplicity of openings therethrough for allowing molten plastic resin to pass while preventing the passage of particulate contaminants contained in the molten plastic resin.

8. The injection molding apparatus of claim 1 wherein the filter comprises a barrel having the accumulation chamber therein, an inlet opening in the barrel communicating with the accumulation chamber at one end thereof, said accumulation chamber has an end wall at the opposite end thereof, a multiplicity of filter openings extending from the accumulation chamber through the filter to an outside surface of the barrel, and means is provided for spacing the barrel of the filter within the opening in the filter body.

9. The apparatus of claim 8 wherein the barrel has an outwardly flared supporting flange adjacent the inlet opening of the accumulation chamber and a plurality of spacer members to define an outlet passage for the molten plastic resin adjacent to the end wall of the filter.

* * * * *